Patented Dec. 19, 1950

2,534,226

UNITED STATES PATENT OFFICE 2,534,226

METHOD OF PREPARING PROTEIN FROM VEGETABLE SOURCES

Francis E. Calvert, Cincinnati, Ohio, assignor to The Drackett Company, Cincinnati, Ohio, a corporation of Ohio No Drawing. Application September 22, 1947, Serial No. 775,563

4 Claims. (Cl. 260—123.5)

This invention relates to an improved process for the treatment of proteinaceous materials of vegetable origin to produce a white or substantially white vegetable protein.

Protein substances have valuable and extensive application in many industrial processes. They are used in the paper industry as the basis of a coating or size for paper, in the plastics industry generally, and in the fabrics field in the form of synthetic fibers. In many of these fields, it is essential that the protein employed be substantially free from color, and the difficulty of producing a light colored or white protein from vegetable sources has proved a serious limitation on the extent of use of such protein.

Thus the final color of dry proteins prepared from vegetable sources may vary from black to light yellow, the more common intermediate shades being dark brown, red, red-brown, and light brown. It can be shown that in protein obtained by existing methods, the color depends primarily upon the particular seeds from which the protein is isolated, and upon the method of isolation. As heretofore produced, most of the vegetable protein is unsatisfactory in the preparation of paper coating, sizings for light colored wall papers, button stock, and for use in other fields in which the final product must be light in color, unless heavily pigmented with white pigments. Pigmentation, however, results in reduction in strength and transparency of the product, and is therefore undesirable.

I have discovered that the coloration observed in such proteins is largely the result of oxidation which occurs in the normal processing of the vegetable material to obtain the protein substance therefrom, the native protein in the bean or seed being usually nearly white or colorless. The oxidation of the protein is a biological phenomenon, catalyzed by oxidative enzymes which are present in the plants or seeds. Apparently this biological oxidation is a protective mechanism developed by the plant to protect it against mechanical injury, the several phases of the process being essentially as follows:

1. Mechanical injury liberates oxidizing enzymes and a chromogenic substance.

2. The oxidizing enzymes, utilizing oxygen from the air or water contained in the vegetable substance, oxidize the chromogenic substance (probably a phenol) to produce a quinone.

3. The quinone (preferably an ortho-quinone) acts as an antiseptic to kill bacteria at the point of injury, thus preventing decay.

4. The quinone simultaneously tans the protein at the point of exposure to produce a mechanical barrier in the nature of scar tissue, preventing further entrance of bacteria.

5. The quinone polymerizes to an insoluble brown pigment.

It should be noted that in the normal processing of protein-yielding vegetable raw materials for the production of protein, the raw materials are subjected to mechanical injury and the formation of a darkly colored product is thus immediately initiated.

It thus appears that three factors contribute to the formation of color in vegetable proteins during processing of the source material, namely oxidizing enzymes, oxygen, and chromogenic or aromatic substances, and that if one of these factors is absent, or chemically or physically inhibited or repressed, the protein should be substantially white. From a practical standpoint, however, I have found that it is impossible to remove completely any one of these factors without destroying or harming the proteins. On the other hand, I have found that if two of these factors are isolated as completely as is practicable, the resulting protein is substantially without color. The present invention therefore contemplates the removal or inhibition of two of these factors, the oxidizing enzymes and oxygen, preferably during the entire period of processing the raw material, and invariably during the more critical period in which the major discoloration is found to occur.

I have discovered that the natural oil of the vegetable source constitutes an effective blanketing agent for use in the practice of the invention, and this application is accordingly directed to the employment of such an oil, in conjunction with an enzyme inhibitor, in the production of my unique protein.

Thus, the principal object of the invention is the preparation of a white or nearly colorless protein from oleaginous vegetable sources, such as the soybean, peanut, cottonseed, and the like, by processing the vegetable material in the presence of its oil, which serves as a blanketing agent, and of an enzyme inhibiting agent, whereby oxygen is excluded from the protein molecule and enzyme activity is minimized.

The vegetable oil has valuable uses, and is therefore commonly removed from the vegetable source as a preliminary step in typical methods for preparing protein. However, no adverse effect is noted as the result of the retention of the oil throughout the process, as contemplated herein, and the oil may be readily recovered from the dried protein product. Isolation of the protein from other source constituents may be effected by known methods and with standard equipment. The inherent simplicity of the present process is apparent.

Example I is a typical standard process for isolating soybean protein. Typical methods of practicing this invention in conjunction with standard isolation procedures are set forth in the remaining specific examples, it being understood that these examples are illustrative only and are not to be construed as limiting the scope of the invention as elsewhere defined.

Example I[1]

To 3,000 grams of water containing 3 grams of sodium hydroxide are added 200 grams of substantially oil-free soybean flakes. The extraction temperature may be varied over a wide range, but the preferable temperature is 45° C. The extraction time may also be varied but the preferred time is usually 30 minutes. During this extraction period the alkaline slurry is slowly but continuously stirred. The pH range may also be varied by adjustment of the amount of alkali from pH 7.5 to 11.5 although the preferred pH range is from 9.0 to 10.0. The spent meal is separated from the yellow protein liquor by straining through cheesecloth. The spent meal is recovered separately and the yellow protein liquor is clarified usually by centrifuging. The clarified liquor is then acidified to precipitate the protein. Sulfuric acid (dilute) is usually used but other acids may be substituted. In order to recover the maximum amount of protein the pH is usually held between 4.2 and 4.8 although other pH ranges may be used. To improve handling properties the clarified liquor is often heated up to 75° C. before acidification.

The protein curd resulting from the acidification is filtered off from the spent liquor, and the curd is dried in an air oven at 45° C.

The resulting dried protein is a flinty, glassy, brownish-yellow product. Examination under the microscope with bottom illumination discloses a clear amber transparent glassy protein substance and is typical of the usual commercial soybean proteins.

Example II

Two hundred and fifty (250) grams of crushed or flaked whole soybeans containing the natural soybean oil are immediately submerged in an aqueous extraction bath comprising 3,000 grams of water and 3 grams of NaCN (the enzyme inhibitor), mixed 5 minutes and then 2.2 grams of NaOH are added. The typical standard extraction procedure of Example I is followed throughout. The resulting dried protein containing soybean oil is extracted with petroleum ether to remove this oil. The petroleum ether is evaporated from the protein and the resulting protein

[1] Typical standard isolation process for soybean protein.

is a white opaque product with a yellowish tinge to the naked eye.

Examination under the microscope with bottom illumination shows a colorless product containing many minute bubbles dispersed throughout, which create the impression of opaqueness. Thus by excluding air from the protein molecule during extraction, and inhibiting the oxidizing enzymes, a colorless protein is obtained, differing from ordinary soy protein as water white glass differs from amber glass.

Example III

Two hundred (200) grams of finely ground delintered and decorticated cottonseed meats are placed in a bath containing 1,700 grams of tap water, two grams of $Na_2S_2O_5$ and two grams of $NH_4SCN$. This solution is stirred for 15 minutes at a temperature of 25° C., then 1.5 grams of NaOH in 25 ml. of water are added. The pH of the solution is now 8.85. The protein is extracted for 30 minutes, at 25° C. The solution is strained and precipitated by adding dilute $H_2SO_4$ to give a pH of 4.48. The precipitate is filtered on Büchner funnels, collected and dried in an air oven at 45° C. The dry protein is extracted with petroleum ether, and then with diethyl ether to remove the residual oil. The solvent is allowed to evaporate. The resulting protein is a bright yellowish-green product, much lighter than cottonseed protein extracted by conventional methods. In this example the blanketing agent is the natural cottonseed oil, and the enzyme inhibitors are $NH_4SCN$ and $Na_2S_2O_5$.

Example IV

Two hundred and fifty (250) grams of freshly flaked soybeans containing all the natural oil are immersed in an extraction bath consisting of 3,000 cc. water, 30 grams of urea and 2 grams of thiourea at a temperature of 45° C. The usual procedure which is an extraction period of 30 minutes, straining, clarification, heating, precipitation, and filtering is followed. The curd containing the natural oil and the enzyme inhibitor is placed in an air oven and dried. The dried protein product contains an excess of natural oil and this is removed by suitable means, for example solvent extraction. The protein product freed of excess blanketing agent is a pale ivory colored product with dull opaque appearance differing radically from the usual vitreous or glassy amber product prepared by conventional methods. Under the microscope the product is revealed to be colorless and transparent and differing from the conventional product like water white ground glass differs from amber colored ground glass.

Example V

Two hundred and fifty (250) grams of freshly flaked soybeans containing all the natural oil are immersed in an extraction bath consisting of 2 grams NaCl and 1 gram of $Na_2S_2O_3$ dissolved in 3,000 cc. $H_2O$ at a temperature of 48° C. The usual procedure of 30 minutes' extraction, straining, clarification, heating to 75° C., precipitating and filtering is followed. The curd containing the natural oil and the enzyme inhibitor is then placed in the air oven and dried. The dried protein which contains an excess of the natural oil is freed of this excess by solvent extraction. The resulting protein substance is a cream colored product of dull opaque appearance differing radically from the amber, horny or vitreous product prepared by conventional methods.

Example VI

Two hundred and fifty (250) grams of freshly flaked soybeans, containing all the natural oil, are immersed in an extraction bath consisting of 3,000 cc. H$_2$O at a temperature of 48° C. containing 2 grams of NaN$_3$ as the enzyme inhibitor. The pH of the bath 5 minutes after adding the flakes is 6.35. The usual procedure of 30 minutes' extraction, straining, clarification, heating to 75° C., precipitating and filtering is followed. The curd containing the natural oil and the enzyme inhibitor is then dried in an air oven. The resulting dried protein containing an excess of oil is then freed of this excess by solvent extraction. The resulting product is a pale ivory colored opaque protein differing markedly from the usual amber glassy vitreous protein prepared by conventional methods.

Example VII

Three hundred and fifty (350) grams of raw whole peanuts with the red skins attached are ground in a food chopper and then placed in a bath containing 3,000 grams of water, 1.3 grams of NH$_4$SCN and 1.3 grams of Na$_2$S$_2$O$_5$. This solution is stirred for 10 minutes at a temperature of 25° C. Then 2.8 grams of NaOH in 25 ml. of water are added. The pH of the solution is now 9.65. The protein was extracted for 30 minutes at 25° C. The usual isolation procedure is then followed including straining, clarification, precipitation, and drying. The dry protein is extracted with petroleum ether to remove the residual oil. The petroleum ether is evaporated off. The resulting protein is white with a faint tinge of pink.

While the lightest colored proteins are obtained when the natural oil is present during the entire period of the isolation procedure, as is the case in the normal practice of the invention, experimental data shows that if the oil is removed as a preliminary step, and introduced at a later stage, material improvement may be effected. For this reason it is believed that the oil performs a function in addition to the exclusion of air or oxygen which may be briefly described as an anti-aggregation effect, the formation of giant molecules by the joining of molecules during the drying period being retarded or prevented by the oil. A possible explanation of this function is as follows:

The wet proteins are highly swollen by water and have water between their molecules. As this water is removed the protein molecules attract each other through secondary forces and thus aggregate to large molecules. However, when oil is present, the oil gradually enters the area occupied by the water as the water is removed, thus physically preventing the protein molecules from aggregating or packing together. The protein is then freed of practically all water by, for example, drying and thus becomes rigid. Removal of the oil by an organic solvent that is unable to swell the protein then leaves the protein in a distended low molecular weight condition containing many voids of molecular size like a sponge. This would be one way of explaining another effect observed, namely, that proteins prepared by my invention dissolve much more rapidly in protein solvents than proteins prepared by ordinary procedures.

In this connection it may be pointed out that by the practice of my invention, improved results other than in the whiteness of the protein are achieved. For instance, when protein prepared as in Example I is soaked in water for 30 minutes and then dissolved by the addition of caustic soda, a tremendous swelling occurs, finally resulting in a gel. In order to break down this gel, and obtain a thin solution, the protein must be heated and mechanically stirred. In contrast, protein prepared in accordance with the present invention, when similarly soaked in water and dissolved with caustic soda, swells momentarily and then almost immediately breaks down into a thin solution, without the aid of heat or mechanical agitation. It is believed that by the present process, the protein is brought to such physical condition that the alkali immediately dissolves the same without a prolonged swelling and gelation period, and that the blanketing agent is chiefly responsible for this result.

It can be shown that the vegetable oils employed herein are capable of forming an adsorption compound with the protein or protein-chromogen complex, and it is believed that by reason of this adsorption phenomenon the following results are achieved:

1. Oxygen is excluded.
2. Molecular aggregation is prevented.
3. That portion of the molecule which can combine with the oxidized chromogen or other substances such as chlorophyll is possibly insulated.

The enzyme inhibiting agents may be selected from widely varying chemical compounds, as is indicated by the following list, representative of various types of effective chemicals:

1. Hydrocyanic acid and soluble cyanides (NaCN, etc.).
2. Thiocyanic acid and soluble thiocyanates (NH$_4$SCN, etc.).
3. Hydrofluoric acid and soluble fluorides (NaF or NH$_4$FHF, etc.).
4. Phosphoric acid and soluble phosphates like sodium phosphates, sodium hexametaphosphate, tetrasodium pyrophosphate.
5. Hydrazoic acid and soluble azides (NaN$_3$, etc.).
6. Hydroxylamine, hydrazine, etc.
7. Thiourea.
8. Carbon monoxide.
9. Sodium diethyldithiocarbamate.
10. Ascorbic acid.
11. Cysteine and salts.
12. Hydrogen sulfide and soluble sulfides like (Na$_2$S).
13. Sulfites, thiosulfites, hydrosulfites, bisulfites, and SO$_2$.

Some inhibitors are effective with respect to certain oxidizing enzymes, for example oxalacetic acid, nicotinic acid amide, iodoacetic acid, pyruvic acid.

Sometimes greater effectiveness has been attained by combining two of the above inhibitors such as NH$_4$SCN and Na$_2$S$_2$O$_5$ or NaCN and Na$_2$SO$_3$, etc.

Considerable attention has been given in the past to the subject of enzyme inhibitors, and the substances effective for this purpose are mentioned in the literature. It will be understood, however, that the use of agents exerting a detrimental effect on the protein should be avoided, and in general, I prefer the less rigorous enzyme inhibitors. An enzyme inhibitor may be defined as any substance which interferes with or retards the chemical reaction normally occurring as the result of the presence of an enzyme. Consequently, the inhibitor may be a compound which combines with either the protein or the prosthetic group of the enzyme to render the same inactive, or in some instances it may combine with both groups. Other substances may inhibit enzyme activity by removing the substrate, or the material upon which the enzyme acts. Thus I may employ reducing agents to remove the substrate peroxide. Prolonged heating destroys the enzyme, but is undesirable because of the adverse effect on the protein.

The enzyme inhibiting agent may be added at any time during the isolation process, but optimum results are obtained by its addition during the early stage of the process. Indeed, I prefer to add the enzyme inhibitor directly to the solvent bath. The blanketing agent, the oil, is present in the raw material prior to solution of the protein therefrom and must remain until the protein is dried, for reasons above indicated.

My process is especially effective as applied to protein derived from soybean, but the improvement in other vegtable materials, for instance protein substances obtained from the peanut or the cottonseed, is also quite evident even from cursory visual inspection. The starting material is ground or crushed, being commonly treated in divided form, such as meal or flake, and contains in each instance the oleaginous constituents.

The following examples indicate the nature of the results achieved with the use of various enzyme inhibitors, a photoelectric reflection meter being used to measure the color of the dry protein samples. This instrument gives readings which may be described in tri-stimulus terms. Three filters, amber (A), blue (B), and green (G), are used. The combination of object with light bulb, filters and photocell of the apparatus, is optically "equivalent" to the stimuli which the average eye receives from the object in question. Thus from the readings of the meter and the application of a few simple formulae the color of a solid substance can be established objectively. For for the present purpose, a suitable description of color can be established by determining luminance and "yellowness." Because the samples showed a yellow hue of practically identical dominant wave length, "yellowness" as described by Hunter in National Bureau of Standards Circular C-429 is an effective way of determining the actual amount of color present in the sample.

Luminance, often called apparent brightness, is the percentage of visual radiant energy incident on the sample that is transmitted. This is essentially the "gray" value of the sample, the percentage of light reflected back to the eye independent of any color. Perfect white has a luminance of 100%; perfect black 0%.

"Yellowness" is calculated as follows:

$$J = \text{yellowness} = \frac{A-B}{G}$$

For a white or perfectly gray surface $J=0$; the more strongly colored a yellow substance is, the higher will be the value of J. For bluish colors this value becomes negative.

In the accompanying chart, therefore, the G filter reading shows the "apparent brightness" or "gray" value of the sample much as the human eye would detect this quality. The yellowness value is a measure of the amount of actual color (yellow) present. In order to secure reproducible readings the protein samples are all ground to the same mesh size of −48 to +65. The samples which have the highest G reading, and yellow values closest to zero, are the whitest. The samples are numbered to correspond to the numbering of the specific examples of the specification, each sample being derived by the process set forth in the corresponding example.

*Reflectance values of protein samples extracted using the natural oil as a blanketing agent*

| Sample | Green Filter | Amber Filter | Blue Filter | Yellowness |
|---|---|---|---|---|
| 2 | 75.5 | 78.4 | 63.2 | 0.201 |
| 3 (Cottonseed) | 52.5 | 55.9 | 31.5 | 0.465 |
| 4 | 66.5 | 71.0 | 50.3 | 0.312 |
| 5 | 62.0 | 68.0 | 43.3 | 0.398 |
| 6 | 63.2 | 67.9 | 47.0 | 0.303 |
| 7 (Peanut) | 57.4 | 61.9 | 47.0 | 0.255 |
| Commercial Soybean Protein | 56.8 | 35.0 | 62.3 | 0.480 |
| Peanut Protein Standard Extraction | 34.4 | 39.4 | 23.6 | 0.459 |
| Cottonseed Protein Standard Extraction | 8.8 | 11.3 | 3.5 | 0.887 |

It will be appreciated that the present invention is not restricted to use with any particular method of protein isolation or incidental treatment, and any well-known protein extraction solvent or conventional treating agents may be used. For example, the process is applicable not only to alkaline and substantially neutral extraction methods but to acid extraction. My invention finds principal use, however, in isolation procedures employing solutions having pH values greater than 6.0, in which discoloration proceeds more rapidly. The solvent employed to remove the oil from the dried protein may be selected from the group of solvents commonly used in oil extraction processes, hexane being most widely used for this purpose. Selection of a suitable solvent constitutes no part of the present invention.

It will be appreciated that in the ultimate use of protein obtained by my method, wherein the dried protein is redissolved, care should again be exercised to insure that the protein does not become discolored while in solution. The preferred method of preventing such discoloration is the conjoint exclusion of oxygen and inhibition of enzyme activity as practiced during the isolation process. It should be noted, however, that the invention finds its principal use in connection with the isolation of protein from the vegetable source, since the isolation process usually tends to accelerate discoloration by reason of the use in the process of large amounts of water and the maintenance of higher pH values (above 6.0). Protein prepared by my method and redissolved without the exercise of special precautions is distinctly lighter than redissolved protein prepared by conventional commercial methods.

The amounts of oil and inhibiting agents employed are not critical and may vary widely. Both agents must, of course, be present in amount sufficient to perform the intended purpose, but need not be employed in quantities substantially in excess of that amount. The oil naturally present in the oleaginous seed material is approximately the lower limit of the amount of oil which must be present in order to obtain a white protein. Obviously in the case of seeds which contain a very high percentage of oil, part of the oil could be removed from such seeds prior to the isolation of the protein and my process would still be effective. I prefer, however, not to remove any of the natural oil prior to the isolation of the protein. It is to be understood that the oil must remain in contact with the protein throughout the entire isolation procedure, including the step of drying the protein. Only after the protein is dry may the oil be separated by some suitable means, such as solvent extraction, without the formation of color in the protein. The number of agents which are suitable for use as inhibitors is so large that it is not feasible to recite percentage ranges in each instance, but suitable proportions are indicated by the foregoing specific examples.

Having thus described the invention, what is claimed as new and desired to be secured by Letters Patent is:

1. A method of obtaining a substantially colorless protein from oleaginous seed materials selected from the group consisting of soybean, peanut, and cottonseed, which includes the steps of isolating protein from the material by immersing the material, together with its natural oil, in an alkaline aqueous solvent for the protein, acidulating the solution to precipitate the protein, separating and drying the protein, introducing in effective amount during the isolation process and prior to the drying of the protein an enzyme inhibiting agent, retaining the oil in contact with the protein until the latter is dried, to exclude oxygen from contact with the protein molecule, and thereafter removing the oil from the protein with a solvent for the oil.

2. A method of obtaining a substantially colorless protein from soybean, which includes the steps of treating the soybean in divided form, together with its natural oil, with an alkaline aqueous solvent for the protein, acidulating the solution to precipitate the protein, separating and drying the protein, introducing in effective amount during the isolation process and prior to the drying of the protein an enzyme inhibiting agent, and retaining the oil in contact with the protein until the latter is dried, to exclude oxygen from contact with the protein molecule.

3. A method of obtaining a substantially colorless protein from oleaginous seed materials selected from the group consisting of soybean, peanut, and cottonseed, which includes the steps of adding to the material an enzyme inhibiting agent, intimately contacting the material and its entrained oil with a solvent for the protein at a pH value of more than 6.0, acidulating the solution to precipitate the protein, separating the protein from the solution, drying the protein, and thereafter removing the oil from the protein with a solvent for the oil.

4. A method of obtaining a substantially colorless protein from soybean, which includes the steps of adding to the soybean and its entrained oil an enzyme inhibiting agent, immersing the soybean in divided form in an aqueous solvent for the protein at a pH of more than 6.0, acidulating the solution to precipitate the protein, separating the protein from the solution, and drying the protein before removal of the oil.

FRANCIS E. CALVERT.

REFERENCES CITED

The following references are of record in the file of this patent:

UNITED STATES PATENTS

| Number | Name | Date |
| --- | --- | --- |
| 696,156 | Wulkan | Mar. 25, 1902 |
| 1,794,105 | David et al. | Feb. 24, 1931 |
| 2,194,835 | Nickerson | Mar. 26, 1940 |